(12) United States Patent
Geng et al.

(10) Patent No.: US 10,027,405 B2
(45) Date of Patent: Jul. 17, 2018

(54) METHOD AND DEVICE FOR CHANNEL SWITCHING, OPTICAL NETWORK UNIT, AND TIME WAVELENGTH DIVISION MULTIPLEXING SYSTEM

(71) Applicant: ZTE Corporation, Shenzhen (CN)

(72) Inventors: Dan Geng, Shenzhen (CN); Weiliang Zhang, Shenzhen (CN); Liquan Yuan, Shenzhen (CN); Dezhi Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/114,042

(22) PCT Filed: Jul. 21, 2014

(86) PCT No.: PCT/CN2014/082648
§ 371 (c)(1),
(2) Date: Jul. 25, 2016

(87) PCT Pub. No.: WO2015/113383
PCT Pub. Date: Aug. 6, 2015

(65) Prior Publication Data
US 2016/0344472 A1    Nov. 24, 2016

(30) Foreign Application Priority Data
Jan. 28, 2014    (CN) .......................... 2014 1 0041371

(51) Int. Cl.
*H04B 10/00*    (2013.01)
*H04B 10/032*    (2013.01)
(Continued)

(52) U.S. Cl.
CPC ........ *H04B 10/032* (2013.01); *H04J 14/0282* (2013.01); *H04J 14/0295* (2013.01);
(Continued)

(58) Field of Classification Search
USPC ..................................................... 398/66–73
See application file for complete search history.

(56) References Cited

U.S. PATENT DOCUMENTS

2006/0127093 A1    6/2006    Park
2014/0219661 A1*    8/2014    Doo .................... H04J 14/0227
398/68
(Continued)

FOREIGN PATENT DOCUMENTS

CN    102045610 A    5/2011
CN    102882801 A    1/2013
(Continued)

OTHER PUBLICATIONS

European Search Report for corresponding application EP14881013; Report dated Jan. 25, 2017.
(Continued)

*Primary Examiner* — Agustin Bello
(74) *Attorney, Agent, or Firm* — Cantor Colburn LLP

(57) ABSTRACT

The present disclosure discloses a method and device for channel switching, an Optical Network Unit (ONU) and a system for Time Wavelength Division Multiplexing (TWDM). The method for channel switching includes that: an ONU acquires channel information of a first TWDM channel, wherein the channel information of the first TWDM channel is used for indicating an uplink wavelength and/or downlink wavelength of the first TWDM channel; and the ONU tunes the uplink wavelength and/or downlink wavelength of the ONU into the uplink wavelength and/or downlink wavelength of the first TWDM channel according to the channel information of the first TWDM channel. By means of the present disclosure, the problem of high cost caused by specially building a standby channel for each TWDM channel in a system for TWDM Passive Optical
(Continued)

Network (PON) to provide service protection is solved, and the cost of deploying the TWDM PON system is reduced.

14 Claims, 9 Drawing Sheets

(51) Int. Cl.
    *H04J 14/02*     (2006.01)
    *H04J 14/08*     (2006.01)
    *H04Q 11/00*     (2006.01)

(52) U.S. Cl.
    CPC .......... *H04J 14/08* (2013.01); *H04Q 11/0005* (2013.01); *H04Q 11/0062* (2013.01); *H04Q 2011/0016* (2013.01); *H04Q 2011/0033* (2013.01); *H04Q 2011/0043* (2013.01); *H04Q 2011/0069* (2013.01)

(56) References Cited

U.S. PATENT DOCUMENTS

| | | | |
|---|---|---|---|
| 2014/0233944 A1* | 8/2014 | Vetter | H04J 14/0282 398/34 |
| 2014/0233954 A1* | 8/2014 | Lee | H04J 14/0246 398/72 |
| 2014/0314414 A1* | 10/2014 | Cheng | H04J 14/02 398/68 |
| 2014/0341579 A1* | 11/2014 | Effenberger | H04J 14/0221 398/68 |
| 2015/0063812 A1* | 3/2015 | Dove | H04B 10/40 398/67 |
| 2015/0207585 A1* | 7/2015 | Luo | H04J 14/0256 398/72 |
| 2015/0365190 A1* | 12/2015 | Wen | H04J 14/0246 398/67 |
| 2016/0006608 A1* | 1/2016 | Khotimsky | H04J 14/026 398/48 |
| 2016/0087748 A1* | 3/2016 | Khotimsky | H04B 10/272 398/67 |
| 2016/0344472 A1* | 11/2016 | Geng | H04B 10/032 |

FOREIGN PATENT DOCUMENTS

| | | |
|---|---|---|
| CN | 103051983 A | 4/2013 |
| CN | 103378918 A | 10/2013 |
| EP | 2408125 A1 | 1/2012 |
| EP | 2680472 A1 | 1/2014 |
| WO | 2011005223 A1 | 1/2011 |

OTHER PUBLICATIONS

International Search Report dated Oct. 29, 2014 re: Application No. PCT/CN2014/085342; pp. 1-2; citing: WO 2013049959 A1 and CN 102790972 A.

\* cited by examiner

| Byte | Content | Description |
|---|---|---|
| 1-2 | an ONU-ID value of an ONU or broadcast the ONU-ID value | send to an ONU or broadcast to all the ONUs |
| 3 | message type | |
| 4 | sequence number | |
| 5-x | the first TWDM PON channel: the uplink wavelength identifier (or the uplink wavelength value) and the downlink wavelength identifier (or the downlink wavelength value)<br>a standby TWDM channel corresponding to the first TWDM PON channel: the uplink wavelength identifier (or the uplink wavelength value) and the downlink wavelength identifier (or the downlink wavelength value)<br>the second TWDM PON channel: the uplink wavelength identifier (or the uplink wavelength value) and the downlink wavelength identifier (or the downlink wavelength value)<br>a standby TWDM channel corresponding to the second TWDM PON channel: the uplink wavelength identifier (or the uplink wavelength value) and the downlink wavelength identifier (or the downlink wavelength value)<br>......<br>the Nth TWDM PON channel: the uplink wavelength identifier (or the uplink wavelength value) and the downlink wavelength identifier (or the downlink wavelength value)<br>a standby TWDM channel corresponding to the Nth TWDM PON channel: the uplink wavelength identifier (or the uplink wavelength value) and the downlink wavelength identifier (or the downlink wavelength value) | |
| (x+1)-40 | fill | |
| 41-48 | Message Integrity Check (MIC) | MIC |

Fig. 7

| Byte | Content | Description |
|---|---|---|
| 1-2 | an ONU-ID value of an ONU or broadcast the ONU-ID value | send to an ONU or broadcast to all the ONUs |
| 3 | message type | |
| 4 | sequence number | |
| 5-x | a standby TWDM channel: the uplink wavelength identifier (or the uplink wavelength value) and the downlink wavelength identifier (or the downlink wavelength value) | |
| (x+1)-40 | fill | |
| 41-48 | MIC | MIC |

Fig. 8

| Byte | Content | Description |
|---|---|---|
| 1-2 | an ONU-ID value of an ONU or broadcast the ONU-ID value | send to an ONU or broadcast to all the ONUs |
| 3 | message type | |
| 4 | sequence number | |
| 5-x | the current TWDM channel: the uplink wavelength identifier (or the uplink wavelength value) and the downlink wavelength identifier (or the downlink wavelength value) the corresponding standby TWDM channel: the uplink wavelength identifier (or the uplink wavelength value) and the downlink wavelength identifier (or the downlink wavelength value) | |
| (x+1)-40 | fill | |
| 41-48 | MIC | MIC |

Fig. 9

| Byte | Content | Description |
|---|---|---|
| 1-2 | an ONU-ID value of an ONU or broadcast the ONU-ID value | send to an ONU or broadcast to all the ONUs |
| 3 | message type | |
| 4 | sequence number | |
| 5-x | the identifier of the first TWDM PON channel<br>the identifier of the standby TWDM channel corresponding to the first TWDM PON channel<br>the identifier of the second TWDM PON channel<br>the identifier of the standby TWDM channel corresponding to the second TWDM PON channel<br>......<br>the identifier of the Nth TWDM PON channel<br>the identifier of the standby TWDM channel corresponding to the Nth TWDM PON channel | |
| (x+1)-40 | fill | |
| 41-48 | MIC | MIC |

Fig. 10

| Byte | Content | Description |
|---|---|---|
| 1-2 | an ONU-ID value of an ONU or broadcast the ONU-ID value | send to an ONU or broadcast to all the ONUs |
| 3 | message type | |
| 4 | sequence number | |
| 5-x | the identifier of the standby TWDM channel | |
| (x+1)-40 | MIC | |
| 41-48 | MIC | MIC |

Fig. 11

| Byte | Content | Description |
|---|---|---|
| 1-2 | an ONU-ID value of an ONU or broadcast the ONU-ID value | send to an ONU or broadcast to all the ONUs |
| 3 | message type | |
| 4 | sequence number | |
| 5-x | the identifier of the current TWDM channel the identifier of the corresponding standby TWDM channel | |
| (x+1)-40 | fill | |
| 41-48 | MIC | MIC |

Fig. 12

METHOD AND DEVICE FOR CHANNEL SWITCHING, OPTICAL NETWORK UNIT, AND TIME WAVELENGTH DIVISION MULTIPLEXING SYSTEM

FIELD

Present disclosure relates to the field of communications, and in particular to a method and device for channel switching, an Optical Network Unit (ONU), and a Time Wavelength Division Multiplexing (TWDM) system.

BACKGROUND

With the development of network technology, a lot of voice, data, video and other services can be transmitted by means of a network, so a demand for bandwidth is enhanced, and a Passive Optical Network (PON) emerges based on the demand.

FIG. 1 is a structural schematic diagram of a PON system according to a related art. As shown in FIG. 1, the PON system consists of an Optical Line Terminal (OLT) of an office-side, an ONU of a user-side, and an Optical Distribution Network (ODN), and generally adopts a point-to-multipoint network structure. The ODN consists of a single mode fiber, an optical splitter, an optical connector and other passive devices, and provides optical transmission media for a physical connection between the OLT and the ONU.

At present, PON technologies with a 40G transmission capacity mainly include a system for TWDM PON. FIG. 2 is a structural schematic diagram of a system for TWDM PON according to a related art; as shown in FIG. 2, each TWDM channel manages a group of ONUs. Uplink wavelengths of a group of ONUs for sending uplink data are the same, and downlink wavelengths for receiving downlink data are the same too. Different ONUs in each group of ONUs transmit the uplink data in a time division multiplexing mode. The downlink wavelengths of different TWDM channels are different, and the uplink wavelengths of each group of ONUs which are managed by different OLTs are different too. According to a command of the OLT, each ONU sends the uplink data in a specific time slot.

In deployment and application of the PON, some users have higher requirements on security and expect operators to provide a corresponding safeguard mechanism to ensure a rapid recovery from the interruption of a service channel. So a standby channel for protection is required for the PON which bears users' service operation.

FIG. 3 is a structural schematic diagram of protection switching of Type B according to the relate art; as shown in FIG. 3, the protection switching of the Type B presented in an existing PON standard can protect the OLT and a trunk fiber. Both of two optical ports PON (0) and PON (1) of the OLT are connected to a 2:N optical splitter, and the optical splitter is downwards connected to each ONU through the fiber. A channel through which the optical port PON (0) of the OLT reaches the ONU by means of the optical splitter is a master channel, and a channel which the optical port PON (1) of the OLT reaches the ONU by means of the optical splitter is a standby channel. After the master channel as a service channel of the ONU and OLT interrupts, the standby channel is enabled to maintain a communication between the ONU and OLT. In this technology, because the uplink wavelength and downlink wavelength of each channel adopt the same configuration, the ONU has no need to tune its uplink wavelength and downlink wavelengths.

It is observed during research that because each TWDM channel in the system for TWDM PON adopts a configuration of different uplink wavelengths and downlink wavelengths, in case of adopting a protection switching solution of the Type B, it is necessary to building a standby channel specially for each TWDM channel to provide service protection, thereby increasing the cost of deploying the PON system.

Aiming at a problem of high cost caused by specially building a standby channel for each TWDM channel in the system for TWDM PON to provide service protection, an effective low cost solution is not available.

SUMMARY

The certain embodiments of present disclosure provide a method and device for channel switching, an ONU, and a TWDM system, so as at least to solve a problem of high cost caused by specially building a standby channel for each TWDM channel in the system for TWDM PON to provide service protection.

According to one embodiment of the present disclosure, a method for channel switching is provided, which includes that: acquiring, by an Optical Network Unit (ONU), channel information of a first Time Wavelength Division Multiplexing (TWDM) channel, wherein the channel information of the first TWDM channel is used for indicating an uplink wavelength and/or downlink wavelength of the first TWDM channel; and tuning, by the ONU, an uplink wavelength and/or downlink wavelength of the ONU into the uplink wavelength and/or downlink wavelength of the first TWDM channel according to the channel information of the first TWDM channel.

According to another embodiment of the present disclosure, a device for channel switching is also provided, which includes: an acquiring component, which is configured to acquire channel information of a first Time Wavelength Division Multiplexing (TWDM) channel, wherein the channel information of the first TWDM channel is used for indicating an uplink wavelength and/or downlink wavelength of the first TWDM channel; and a tuning component, which is configured to tune an uplink wavelength and/or downlink wavelength of an Optical Network Unit (ONU) into the uplink wavelength and/or downlink wavelength of the first TWDM channel according to the channel information of the first TWDM channel.

According to yet another embodiment of the present disclosure, an ONU is also provided, which includes the device for channel switching.

According to a further embodiment of the present disclosure, a system for TWDM is also provided, which includes: an OLT and an ONU. The OLT is configured to send channel information of a first TWDM channel, wherein the channel information of the first TWDM channel is used for indicating an uplink wavelength and/or downlink wavelength of the first TWDM channel; and the ONU is configured to acquire the channel information of the first TWDM channel and tune, according to the channel information of the first TWDM channel, an uplink wavelength and/or downlink wavelength of the ONU into the uplink wavelength and/or downlink wavelength of the first TWDM channel.

In certain embodiments, the ONU acquires the information of the first TWDM channel, wherein the information of the first TWDM channel is used for indicating the uplink wavelength and/or downlink wavelength of the first TWDM channel; and the ONU tunes the uplink wavelength and/or downlink wavelength of the ONU into the uplink wavelength and/or downlink wavelength of the first TWDM channel according to the information of the first TWDM channel; in this way, the problem of high cost caused by specially building a standby channel for each TWDM channel in the system for TWDM PON to provide service protection is solved, and the cost of deploying the TWDM PON system is reduced.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings:

FIGS. 7 through 12 are structural schematic diagrams of information of a TWDM channel according to certain embodiments of the present disclosure.

DETAILED DESCRIPTION

It needs to be noted that the embodiments of the present disclosure and the characteristics in these exemplary embodiments can be combined under the condition of no conflicts. The present disclosure is described below with reference to the accompanying drawings and embodiments in detail.

These steps presented in the flowchart of the accompanying drawings can be executed in a computer system like a group of machine-executable instructions; besides, although a logical sequence is shown in the flowchart, in some cases, the presented or described steps can be performed in a sequence different from that described here.

In certain embodiments, "the first" and "the second" in description of "the first TWDM channel" and "the second TWDM channel", or "the first determining component" and "the second determining component", and others are not intended to limit the sequence of the terms but differentiate corresponding terms. Besides, under the condition of no conflicts, "the first determining component" and "the second determining component" can also be the same component, or "the first determining component" and "the second determining component" are integrated as one component.

Figure 1:
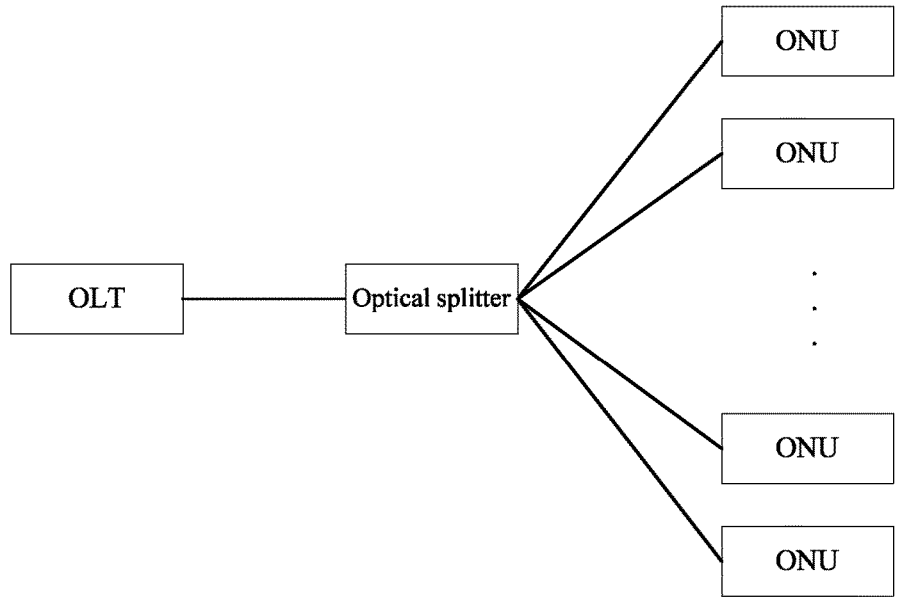
FIG. 1 is a structural schematic diagram of a system for PON according to a related art.
Figure 2:
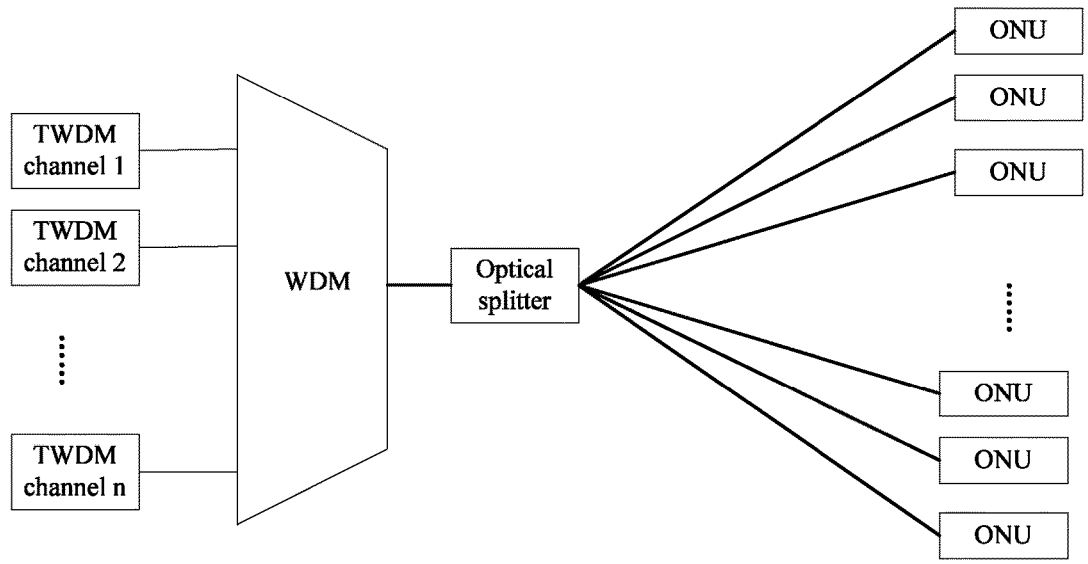
FIG. 2 is a structural schematic diagram of a system for TWDM PON according to the related art.
Figure 3:
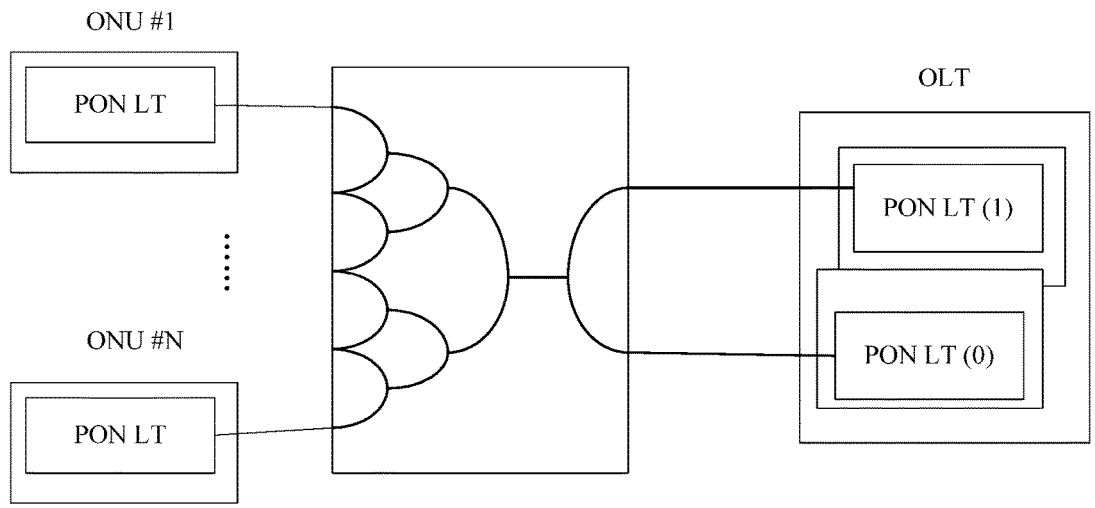
FIG. 3 is a structural schematic diagram of protection switching of Type B according to the related art.
Figure 4:
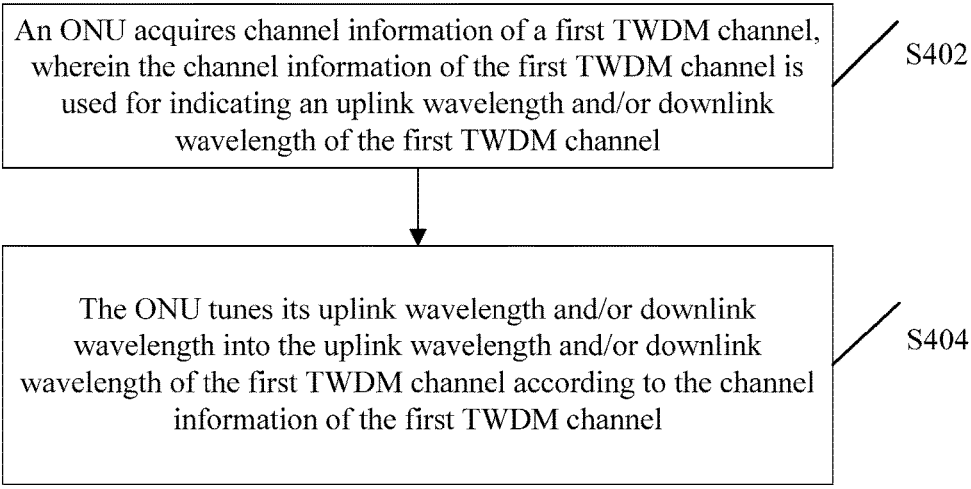
FIG. 4 is a flowchart of a method for channel switching according to certain embodiments of the present disclosure.

The present embodiment provides a method for channel switching. FIG. 4 is a flowchart of a method for channel switching according to an embodiment of the present disclosure; as shown in FIG. 4, the flow includes the following steps:

Step 402: an ONU acquires channel information of a first TWDM channel, wherein the channel information of the first TWDM channel is used for indicating an uplink wavelength and/or downlink wavelength of the first TWDM channel; and Step 404: the ONU tunes the uplink wavelength and/or downlink wavelength of the ONU into the uplink wavelength and/or downlink wavelength of the first TWDM channel according to the channel information of the first TWDM channel.

By means of the above steps, the ONU tunes uplink wavelength and/or downlink wavelength of the ONU according to the acquired channel information of the first TWDM channel, so that the channel where the ONU works is switched to the first TWDM channel; in this way, the problem of high cost caused by specially building a standby channel for each TWDM channel in the TWDM PON system to provide service protection is solved, and the cost of deploying the TWDM PON system is reduced.

In certain embodiments, the ONU switches a service of the ONU to the first TWDM channel after tuning the uplink wavelength and/or downlink wavelength.

In some embodiments, when it is needed to perform channel switching, the ONU can inform the OLT to provide the channel information of the first TWDM channel; or the ONU performs service switching according to the channel information of the first TWDM channel after waiting for the OLT to send the channel information. In certain embodiments, after Step 402, the ONU stores the channel information of the first TWDM channel. In this way, when it is needed to perform channel switching, the ONU can perform channel switching according to the stored channel information. In certain embodiments, a lifetime with a predetermined duration is set for the stored channel information of the first TWDM channel. After the lifetime is reached, the channel information is cleared or invalidated. At this time, the ONU can acquire and store new channel information of the first TWDM channel again.

In the system for TWDM PON of the present embodiment, it is possible to adopt at least one standby TWDM channels to protect multiple TWDM channels, so when the channel information is sent from the OLT to the ONU, the OLT can send the channel information of the standby TWDM channel corresponding to one ONU to this one ONU or send the channel information of the standby TWDM channel corresponding to each of all ONUs to all ONUs. In certain embodiments, when the channel information sent by the OLT is the channel information of the standby TWDM channel corresponding to each ONU, the ONU receives the channel information of multiple TWDM channels, wherein the channel information of multiple TWDM channels is used for indicating the uplink wavelength and/or downlink wavelength of the multiple TWDM channels and a corresponding relationship between each TWDM channel and the standby TWDM channel of each TWDM channel. The ONU determines the standby TWDM channel corresponding to a second TWDM channel as the first TWDM channel according to the corresponding relationship.

In certain embodiments, the channel information of the first TWDM channel is periodically broadcasted by the OLT on at least one TWDM channels, wherein the at least one TWDM channels include the second TWDM channel. In certain embodiments, a period of broadcasting the channel information is less than or equal to the lifetime of the stored channel information.

In certain embodiments, before the ONU tunes the uplink wavelength and/or downlink wavelength of the ONU into the uplink wavelength and/or downlink wavelength of the first TWDM channel, it is determined whether the ONU needs to perform channel switching by judging whether the second TWDM channel where the ONU works currently is normal, wherein when the second TWDM channel is abnormal, the ONU tunes the uplink wavelength and/or downlink wavelength of the ONU into the uplink wavelength and/or downlink wavelength of the first TWDM channel.

In certain embodiments, it is feasible to judge whether the second TWDM channel where the ONU works currently is normal by detecting an uplink signal through the OLT or detecting a downlink signal through the ONU.

In certain embodiments, when it is judged by detecting the uplink signal through the OLT, the ONU receives a notification about abnormity which is sent by the OLT and judges that the second TWDM channel is abnormal according to the notification about abnormity. The notification about abnormity is sent by the OLT to all the ONUs which work on the second TWDM channel when the OLT cannot receive, through the second TWDM channel, the uplink signals of all the ONUs which work on the second TWDM channel.

In certain embodiments, when it is judged by detecting the downlink signal through the ONU, the ONU judges that whether a duration of the downlink signal being not detected on the second TWDM channel exceeds the predetermined duration; when the duration exceeds the predetermined duration, it is determined that the second TWDM channel is abnormal.

In some embodiments, when it is judged whether the second TWDM channel is normal, the ONU detects that the downlink signals on the second TWDM channel are lost synchronously. The ONU enters a O6 state and starts a timer T2. When not receiving the downlink signal before the timer T2 times out, the ONU determines that the second TWDM channel is abnormal.

In certain embodiments, when the second TWDM channel is abnormal, Step 404 may include that: the ONU enters a state O1, tunes uplink wavelength and/or downlink wavelength of the ONU into the uplink wavelength and/or downlink wavelength of the first TWDM channel, and starts activating on the first TWDM channel.

In certain embodiments, when the second TWDM channel is abnormal, Step 404 may include that: the ONU enters the state O1 and starts a timer T3; when not receiving the downlink signal before the timer T3 times out, the ONU enters a state O8, which is a wavelength tuning state; in the state O8, the ONU tunes the uplink wavelength and/or downlink wavelength of the ONU into the uplink wavelength and/or downlink wavelength of the first TWDM channel, and receives the downlink signal through the first TWDM channel after completing tuning; and the ONU enters a state O4 or a state O5 after completing the synchronization of the downlink signal.

In certain embodiments, when the ONU enters the state O1 or the state O8, transmission convergence layer configuration parameters of the ONU are retained. The ONU clears the transmission convergence layer configuration parameters when receiving the downlink signal before the timer T3 times out.

In certain embodiments, when the second TWDM channel is abnormal, the method may also include that: the OLT transmits transmission convergence layer configuration information of all the ONUs which work on the second TWDM channel to the first TWDM channel.

In certain embodiments, when the second TWDM channel is abnormal, Step 404 may include that: the ONU enters the state O8, which is the wavelength tuning state; in the state O8, the ONU retains the transmission convergence layer configuration parameters of the ONU, and tunes the uplink wavelength and/or downlink wavelength of ONU into the uplink wavelength and/or downlink wavelength of the first TWDM channel; and the ONU enters the state O4 or the state O5 after completing tuning.

In certain embodiments, when the second TWDM channel is abnormal, Step 404 may include that: the ONU tunes the uplink wavelength and/or downlink wavelength of the ONU into the uplink wavelength and/or downlink wavelength of the first TWDM channel; and the ONU enters the state O4 or the state O5 after completing tuning.

In certain embodiments, when the second TWDM channel is abnormal, before Step 404, the ONU judges whether the channel information of the second TWDM channel is stored locally; when determining that the channel information of the second TWDM channel is stored locally, the ONU tunes the uplink wavelength and/or downlink wavelength of the ONU into the uplink wavelength and/or downlink wavelength of the first TWDM channel.

In certain embodiments, when determining that the channel information of the second TWDM channel is not stored locally, the ONU enters the state O1.

In certain embodiments, the channel information of the first TWDM channel includes at least one of the followings: a channel identifier of the first TWDM channel, an uplink wavelength identifier and/or downlink wavelength identifier of the first TWDM channel, and an uplink wavelength value and/or downlink wavelength value of the first TWDM channel. When the channel information is the channel identifier or the uplink wavelength identifier and/or downlink wavelength identifier, the ONU determines the uplink wavelength value and/or downlink wavelength value corresponding to the channel information based on a corresponding relationship between the channel identifier or the uplink wavelength identifier and/or downlink wavelength identifier and the uplink wavelength value and/or downlink wavelength value, wherein the corresponding relationship is negotiated in advance.

In certain embodiments, the channel information of the first TWDM channel is dynamically updated and provided to the ONU by the OLT. For example, when the channel information of the first TWDM channel changes (or the information of the standby TWDM channel of the ONU changes), the OLT sends the new channel information to the ONU.

The present embodiment also provides a device for channel switching, which is configured to implement the method for channel switching. The specific implementation of the device which is described in the embodiment of the device has been elaborated in the embodiment of the method, so it will not be repeated here.

Figure 5:
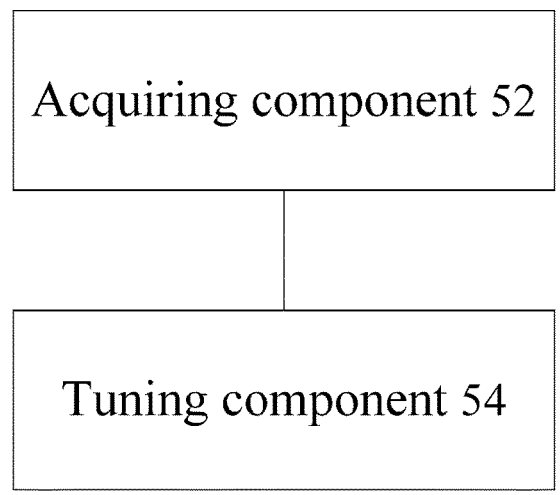
FIG. 5 is a structural schematic diagram of a device for channel switching according to certain embodiments of the present disclosure.

FIG. 5 is a structural schematic diagram of a device for channel switching according to an embodiment of the present disclosure; as shown in FIG. 5, the device for channel switching includes: an acquiring component 52 and a tuning component 54. The acquiring component 52 is configured to acquire the channel information of the first TWDM channel, wherein the information of the first TWDM channel is used for indicating the uplink wavelength and/or downlink wavelength of the first TWDM channel. The tuning component 54 is coupled with the acquiring component 52 and configured to tune the uplink wavelength and/or downlink wavelength of the ONU into the uplink wavelength and/or downlink wavelength of the first TWDM channel according to the channel information of the first TWDM channel.

The components and elements involved In certain embodiments can be implemented in the form of software or hardware. The components and elements described In certain embodiments can also be set in a processor; for example, a description can be: a processor includes an acquiring component 52 and a tuning component 54. Names of these components are not intended to limit the components in some cases; for example, the acquiring component 52 can also be described as "a component which is configured to acquire the information of the first TWDM channel".

In certain embodiments, the device may also include: a switching component, which is coupled with the tuning component 54 and configured to switch the service of the ONU to the first TWDM channel.

In certain embodiments, the device may also include: a storing component, which is coupled to the acquiring component 52 and the tuning component 54, and configured to store the channel information of the first TWDM channel.

In certain embodiments, the acquiring component 52 may include: a first receiving element, which is configured to receive the channel information of multiple TWDM channels, wherein the channel information of multiple TWDM channels is used for indicating the uplink wavelength and/or downlink wavelength of the multiple TWDM channels and the corresponding relationship between each TWDM channel and the standby TWDM channel of each TWDM channel; and a first determining element, which is coupled with the first receiving element and configured to determine the standby TWDM channel corresponding to the second TWDM channel as the first TWDM channel according to the corresponding relationship.

In certain embodiments, the channel information of the first TWDM channel is periodically broadcasted by the OLT on at least one TWDM channels, wherein the at least one TWDM channels include the second TWDM channel.

In certain embodiments, the device may also include: a first judging component, which is coupled with the tuning component 54 and configured to judge whether the second TWDM channel where the ONU works currently is normal; when the second TWDM channel is abnormal, the tuning component 54 tunes the uplink wavelength and/or downlink wavelength of the ONU into the uplink wavelength and/or downlink wavelength of the first TWDM channel.

In certain embodiments, the first judging component may include: a first receiving element, which is configured to receive the notification about abnormity which is sent by the OLT, wherein the notification about abnormity is sent by the OLT to all the ONUs which work on the second TWDM channel when the OLT cannot receive, through the second TWDM channel, the uplink signals of all the ONUs which work on the second TWDM channel; and a first judging element, which is coupled with the first receiving element and configured to determine that the second TWDM channel is abnormal according to the notification about abnormity.

In certain embodiments, the first judging component may include: a second judging element, which is configured to judge that whether the duration of the downlink signal not being detected on the second TWDM channel exceeds the predetermined duration; a third judging element, which is coupled with the second judging element and configured to determine that the second TWDM channel is abnormal when the duration exceeds the predetermined duration.

In certain embodiments, the third judging element is configured to, when detecting that the downlink signals of the ONU on the second TWDM channel are lost synchronously, enter the O6 state, and start the timer T2; the third judging element is further configured to determine that the second TWDM channel is abnormal when the ONU does not receive the downlink signal before the timer 2 times out.

In certain embodiments, the tuning component 54 is configured to, when the second TWDM channel is abnormal, enter the state O1, tune the uplink wavelength and/or downlink wavelength of the ONU into the uplink wavelength and/or downlink wavelength of the first TWDM channel, and start activating on the first TWDM channel.

In certain embodiments, the tuning component 54 is configured to, when the second TWDM channel is abnormal, enter the state O1 and start the timer T3; the tuning component 54 is further configured to, when the downlink signal is not received by the ONU before the timer T3 times out, enter the state O8, which is the wavelength tuning state; in the state O8, tune the uplink wavelength and/or downlink wavelength of the ONU into the uplink wavelength and/or downlink wavelength of the first TWDM channel, and receive the downlink signal through the first TWDM channel after completing tuning; the tuning component 54 is further configured to enter the state O4 or the state O5 after completing the synchronization of the downlink signal.

In certain embodiments, the third judging element is further configured to, when entering the state O1 or the state O8, retain the transmission convergence layer configuration parameters of the ONU; or the third judging element is further configured to clear the transmission convergence layer configuration parameters when the downlink signal is received before the timer T3 times out.

In certain embodiments, the tuning component 54 is configured to, when the second TWDM channel is abnormal, enter the state O8, which the wavelength tuning state; in the state O8, retain the transmission convergence layer configuration parameters, and tune the uplink wavelength and/or downlink wavelength of the ONU into the uplink wavelength and/or downlink wavelength of the first TWDM channel; the tuning component 54 is further configured to enter the state O4 or the state O5 after completing tuning.

In certain embodiments, the tuning component 54 is configured to, when the second TWDM channel is abnormal, tune the uplink wavelength and/or downlink wavelength of the ONU into the uplink wavelength and/or downlink wavelength of the first TWDM channel, and enter the state O4 or the state O5 after completing tuning.

In certain embodiments, the device may also include: a second judging component, which is coupled with the first judging component and configured to, when the second TWDM channel is abnormal, judge whether the channel information of the second TWDM channel is stored locally; when it is determined that the information of the second TWDM channel is stored locally, the tuning component 54 tunes the uplink wavelength and/or downlink wavelength of the ONU into the uplink wavelength and/or downlink wavelength of the first TWDM channel.

In certain embodiments, the device may also include: an indicating component, which is coupled with the second judging component and configured to, when the second judging component determines that the channel information of the second TWDM channel is not stored locally, enter the state O1.

In certain embodiments, the channel information of the first TWDM channel includes at least one of the followings: the channel identifier of the first TWDM channel, the uplink wavelength identifier and/or downlink wavelength identifier of the first TWDM channel, and the uplink wavelength value and/or downlink wavelength value of the first TWDM channel.

In certain embodiments, the channel information of the first TWDM channel is dynamically updated and provided to the ONU by the OLT.

The present embodiment also provides an ONU, which includes the device for channel switching.

Figure 6:
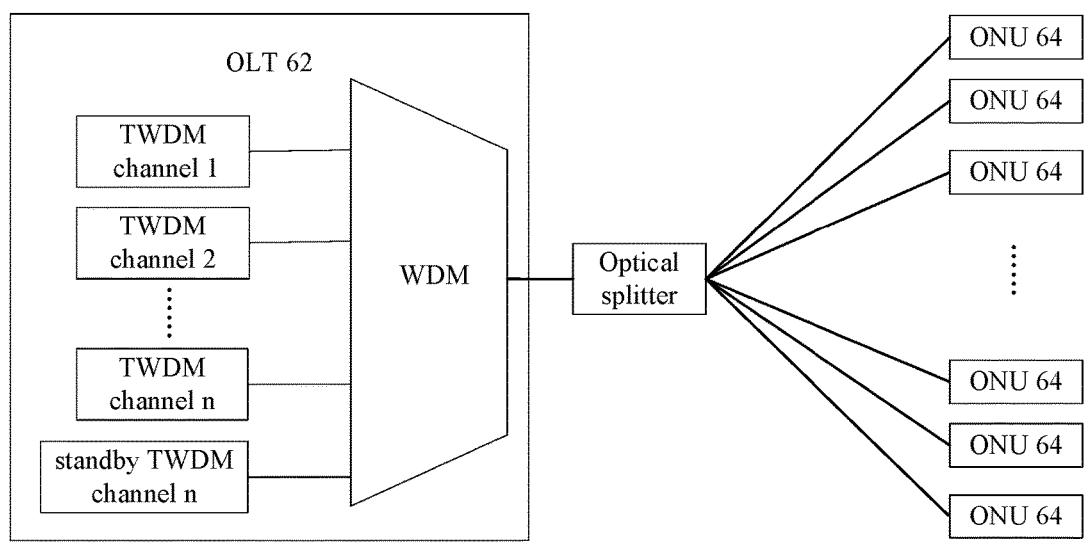
FIG. 6 is a structural schematic diagram of a system for TWDM according to certain embodiments of the present disclosure.

The present embodiment also provides a system for TWDM. FIG. 6 is a structural diagram of a system for TWDM according to an embodiment of the present disclosure; as shown in FIG. 6, the system for TWDM includes an OLT 62 and an ONU 64. The OLT 62 is configured to send the channel information of the first TWDM channel, wherein the channel information of the first TWDM channel is used for indicating the uplink wavelength and/or downlink wavelength of the first TWDM channel. The ONU 64 is configured to acquire the channel information of the first TWDM channel and tune the uplink wavelength and/or downlink wavelength of the ONU into the uplink wavelength and/or downlink wavelength of the first TWDM channel according to the channel information of the first TWDM channel.

In certain embodiments, the ONU 64 is further configured to judge whether the second TWDM channel where it works currently is normal, and when the second TWDM channel is abnormal, tune the uplink wavelength and/or downlink wavelength of the ONU into the uplink wavelength and/or downlink wavelength of the first TWDM channel.

In certain embodiments, the OLT 62 is further configured to, when the second TWDM channel is abnormal, transmit the transmission convergence layer configuration information of all the ONUs which work on the second TWDM channel to the first TWDM channel.

In certain embodiments, the states from O1 to O7 of the ONU are prescribed according to related specifications. For example, seven states from O1 to O7 of the ONU defined in a transmission convergence layer specification of the gigabit PON are as follows.

An initial state O1: the ONU sets up an optical power and detects an alarm signal in this state. Once a downstream message is received and the alarm signal is cleared, the ONU goes to a standby state O2.

A standby state (a ready state) O2: the ONU receives a downstream message and waits for an Upstream-Overhead message. Once the Upstream-Overhead message is received, the ONU starts configuring parameters and goes to a serial number state O3.

A serial number state O3: the OLT finds new ONUs and their serial numbers by sending a serial number request to all the ONUs in the serial number state O3. Once the ONU is found, the OLT assigns the unique ONU-ID through an Assign-ONU-ID message and then goes to a ranging state O4.

A ranging state O4: it is needed to perform synchronization between uplink transmissions from different ONUs and uplink frames. For making distances from all the ONUs to the OLT seem to be the same, each ONU needs an equalized time delay. The time delay is measured in the ranging state. Once receiving a Ranging-time message, the ONU goes to a working state.

A working state (running state) O5: only in this state, the ONU can send uplink data and PLOAM message according to an indication of the OLT.

A popping state O6: an emergency stop state O7 is an abnormal state of the ONU; after all exceptional cases are excluded, the popping state O6 enters the ranging state again after the protection switching is performed, and the emergency stop state O7 returns to the ready state O2, and all the information is detected again.

A description and illustration are given below in combination with example embodiments.

The example embodiments provide a method for protection switching in a PON. In the example embodiments, to protect an entire system for TWDM PON, a method of taking a working TWDM channel as a standby channel of another TWDM channel in the TWDM PON system or building a special standby TWDM channel for the entire TWDM system is adopted. The example embodiments provides the method for protection switching; by means of the method, in case of adopting the above two protection switching structures, the ONU tunes from the current working TWDM channel to the standby TWDM channel corresponding to the working TWDM channel when the protection switching happens. In the method for protection switching, before the ONU tunes a value of its own TWDM channel, the ONU obtains a value of the TWDM channel corresponding to the standby channel of the ONU, so as to implement the normal service transmission after the protection switching. In some specific implementation solutions of the example embodiments, a solution that the ONU judges under what conditions the ONU tunes the TWDM channel of the ONU to complete protection switching is also provided.

For solving the problem that the ONU obtains a value of the standby TWDM channel in the case of saving device cost and judges whether to perform protection switching, the example embodiments adopt the following technical solution.

Step 1: the OLT sends the ONU the channel information of the standby TWDM channel corresponding to each TWDM channel, wherein the channel information of the standby TWDM channel includes: the channel identifier of the standby TWDM channel corresponding to each TWDM channel, or the uplink wavelength identifier and/or downlink wavelength identifier corresponding to the standby TWDM channel, or the uplink wavelength value and/or downlink wavelength value corresponding to the standby TWDM channel.

Step 2: the ONU stores the channel information.

Step 3: when the OLT cannot receive the uplink signals sent by all the ONUs, the OLT informs all the ONUs working on the current TWDM channel to tune to the standby TWDM channel to perform protection switching; or when the ONU cannot detect a downlink optical signal on the current working TWDM channel in a certain period of time, the ONU tunes to a protection TWDM channel corresponding to the current working TWDM channel to work.

In certain embodiments, that the OLT sends the channel information of the standby TWDM channel corresponding to each TWDM channel to the ONU includes that: the OLT periodically broadcasts the following information on all the TWDM channels: the channel identifier of the standby TWDM channel corresponding to each TWDM channel, or the uplink wavelength identifier or downlink wavelength identifier of the standby TWDM channel corresponding to each TWDM channel, or the uplink wavelength value or downlink wavelength value of the standby TWDM channel corresponding to each TWDM channel.

In certain embodiments, that the OLT sends the channel information of the standby TWDM channel corresponding to each TWDM channel to the ONU includes that: the OLT periodically broadcasts the following information on each TWDM channel: the channel identifier of the standby TWDM channel corresponding to the current TWDM channel, or the uplink wavelength identifier or downlink wavelength identifier of the standby TWDM channel corresponding to the current TWDM channel, or the uplink wavelength value or downlink wavelength value of the standby TWDM channel corresponding to the current TWDM channel.

In certain embodiments, after detecting a downlink synchronization loss, the ONU enters the O6 state and starts the timer T2; after the timer T2 times out, if the ONU does not receive the downlink signal, the ONU enters the state O1 and starts the timer T3; after the timer T3 times out, if the ONU does not receive the downlink signal, the ONU registers again after tuning to the standby TWDM channel corresponding to the current TWDM channel.

In certain embodiments, after detecting the downlink synchronization loss, the ONU enters the O6 state and starts the timer T2; after the timer T2 times out, if the ONU does not receive the downlink signal, the ONU enters the state O1 and starts the timer T3; after the timer T3 times out, if the ONU does not receive the downlink signal, the ONU enters the wavelength tuning state O8; in the state O8, the ONU tunes to the standby TWDM channel corresponding to the current TWDM channel to receive the downlink signal; the ONU enters the ranging state O4 or the running state O5 after completing the synchronization of the downlink signal.

Wherein, after the working TWDM channel has a failure, the OLT transmits the transmission convergence layer configuration information of all the ONUs on the current TWDM channel to the standby TWDM channel corresponding to the current TWDM channel.

Wherein, after entering the state O1, the ONU retains its own transmission convergence layer configuration parameters; if the ONU receives the downlink signal before the timer T3 times out, the ONU clears the transmission convergence layer configuration parameters of the ONU; if ONU does not receive the downlink signal after the timer T3 times out, the ONU enters the wavelength tuning state O8 and retains the transmission convergence layer configuration parameters of the ONU.

In certain embodiments, that when the ONU cannot detect the downlink optical signal on the current working TWDM channel in a certain period of time, the ONU tunes to the protection TWDM channel corresponding to the current working TWDM channel to work includes that: when the downlink synchronization loss is detected by the ONU, the ONU enters the O6 state and starts the timer T2; if the ONU does not receive the downlink signal after the timer T2 times out, the ONU enters the state O8 (the wavelength tuning state). The ONU retains the transmission convergence layer configuration parameters of the ONU, starts wavelength tuning, and tunes to the standby TWDM channel corresponding to the current working TWDM channel; after completing tuning, the ONU enters the state O5 or state O4, and starts working on the channel.

In certain embodiments, that when the ONU cannot detect the downlink optical signal on the current working TWDM channel in a certain period of time, the ONU tunes to the protection TWDM channel corresponding to the current working TWDM channel to work includes that: when the ONU cannot detect the downlink signal, the ONU detects the downlink synchronization loss, enters the O6 state, and starts the timer T2; if the ONU dose not receive the downlink signal after the timer T2 times out, the ONU starts performing wavelength tuning, and tunes to the standby TWDM channel corresponding to the current working TWDM channel; after completing tuning, the ONU enters the state O5 or state O4, and starts working on the channel.

In certain embodiments, when the ONU cannot detect the downlink optical signal, the ONU stats the timer; when the timer times out, if the ONU cannot detect the downlink optical signal, the ONU judges whether the information of the standby TWDM channel is stored locally; if so, the ONU tunes to the standby TWDM channel; if not, the ONU returns to the state O1.

In certain embodiments, the OLT can update the information of the standby TWDM channel corresponding to each TWDM channel dynamically.

In the example embodiment, the number of protection channels of the OLT can be reduced by tuning the wavelength of ONU to implement protection switching, thereby reducing the cost of the OLT caused by a protection switching requirement. By means of the method for protection switching provide by the example embodiment, the ONU obtains an identity value of its own protection TWDM channel, so the ONU can switch to the protection channel for service recovery when determining that it is needed to perform protection switching.

The example embodiment is described and illustrated below in combination with the accompanying drawings and examples.

Example 1

In Step 1, the OLT sends the ONU the identifier of the standby TWDM channel corresponding to each TWDM channel, or the uplink wavelength identifier or downlink wavelength identifier corresponding to the standby TWDM channel, or the uplink wavelength value or downlink wavelength value corresponding to the standby TWDM channel.

In certain embodiments, the OLT can send the ONU one of the messages shown in FIG. 7 to FIG. 12. For example, the OLT can send the above information to the ONU in one of following two ways.

The first way: the OLT periodically broadcasts the information in FIG. 7, FIG. 8, FIG. 10 or FIG. 11 to the ONU on all the TWDM channels.

The second way: the OLT periodically broadcasts the information in FIG. 8, FIG. 9, FIG. 11 or FIG. 12 on each TWDM channel.

In Step 2, the ONU stores the information.

In Step 3, when the downlink synchronization loss is detected by the ONU, the ONU enters the O6 state and starts the timer T2; if the ONU does not receive the downlink signal after the timer T2 times out, the ONU enters the state O1; the ONU starts the timer T3 after entering the state O1; if the ONU receives the downlink signal before the timer T3 times out, the ONU completes registration on the TWDM channel; if the ONU does not receive the downlink signal after the timer T3 times out, it tunes to the standby TWDM channel corresponding to the current working TWDM channel; after tuning, the ONU enters the state O1 and starts activating on the channel.

In certain embodiments, the OLT can update the information of the standby TWDM channel corresponding to each TWDM channel dynamically.

In the present embodiment, it is feasible that when the OLT cannot receive the uplink signals sent by all the ONUs, it informs all the ONUs working on the current TWDM channel to tune to the standby TWDM channel to perform protection switching. The ONU receiving the command tunes to the standby channel to complete protection switching. After completing tuning, the ONU enters the O1 state and starts activating on the channel; or the ONU enters the state O4 and ranges; or the ONU enters the state O5 and works directly.

Example 2

In Step 1, the OLT sends the ONU the identifier of the standby TWDM channel corresponding to each TWDM channel, or the uplink wavelength identifier or downlink wavelength identifier corresponding to the standby TWDM channel, or the uplink wavelength value or downlink wavelength value corresponding to the standby TWDM channel.

In certain embodiments, the OLT can send the ONU one of the messages shown in FIG. 7 to FIG. 12. For example, the OLT can send the above information to the ONU in one of following two ways.

The first way: the OLT periodically broadcasts the information in FIG. 7, FIG. 8, FIG. 10 or FIG. 11 to the ONU on all the TWDM channels.

The second way: the OLT periodically broadcasts the information in FIG. 8, FIG. 9, FIG. 11 or FIG. 12 on each TWDM channel.

In Step 2, the ONU stores the information.

After the working TWDM channel has a failure, the OLT transmits the transmission convergence layer configuration information of all the ONUs on the current TWDM channel to the standby TWDM channel corresponding to the current TWDM channel.

In Step 3, when the downlink synchronization loss is detected by the ONU, the ONU enters the O6 state and starts the timer T2; if the ONU does not receive the downlink signal after the timer T2 times out, the ONU enters the state O1; the ONU starts the timer T3 after entering the state O1; if the ONU receives the downlink signal before the timer T3 times out, the ONU clears the transmission convergence layer configuration parameters of the ONU, and completes registration on the TWDM channel. If the ONU does not receive the downlink signal after the timer T3 times out, the ONU retains the transmission convergence layer configuration parameters of the ONU, enters the state O8 (the wavelength tuning state) and starts wavelength tuning; the ONU tunes to the standby TWDM channel corresponding to the current working TWDM channel; after completing tuning, the ONU enters the state O4 and starts activating on the channel.

In certain embodiments, the OLT can update the information of the standby TWDM channel corresponding to each TWDM channel dynamically.

In the present embodiment, it is feasible that when the OLT cannot receive the uplink signals sent by all the ONUs, it informs all the ONUs working on the current TWDM channel to tune to the standby TWDM channel to perform protection switching. The ONU receiving the command tunes to the standby channel to complete protection switching. After completing tuning, the ONU enters the O1 state and starts activating on the channel; or the ONU enters the state O4 and ranges; or the ONU enters the state O5 and works directly.

Example 3

In Step 1, the OLT sends the ONU the identifier of the standby TWDM channel corresponding to each TWDM channel, or the uplink wavelength identifier or downlink wavelength identifier corresponding to the standby TWDM channel, or the uplink wavelength value or downlink wavelength value corresponding to the standby TWDM channel.

In certain embodiments, the OLT can send the ONU one of the messages shown in FIG. 7 to FIG. 12. For example, the OLT can send the above information to the ONU in one of following two ways.

The first way: the OLT periodically broadcasts the information in FIG. 7, FIG. 8, FIG. 10 or FIG. 11 to the ONU on all the TWDM channels.

The second way: the OLT periodically broadcasts the information in FIG. 8, FIG. 9, FIG. 11 or FIG. 12 on each TWDM channel.

In Step 2, the ONU stores the information.

In Step 3, after the working TWDM channel has a failure, the OLT transmits the transmission convergence layer configuration information of all the ONUs on the current TWDM channel to the standby TWDM channel corresponding to the current TWDM channel; when the downlink synchronization loss is detected by the ONU, the ONU enters the O6 state and starts the timer T2; if the ONU does not receive the downlink signal after the timer T2 times out, the ONU enters the state O1; the ONU starts the timer T3 after entering the state O1; if the ONU receives the downlink signal before the timer T3 times out, the ONU clears its own transmission convergence layer configuration parameters, and completes registration on the TWDM channel. If the ONU does not receive the downlink signal after the timer T3 times out, the ONU retains the transmission convergence layer configuration parameters of the ONU, enters the state O8 (the wavelength tuning state) and starts wavelength tuning; the ONU tunes to the standby TWDM channel corresponding to the current working TWDM channel; after completing tuning, the ONU enters the state O5 and starts working on the channel.

In certain embodiments, the OLT can update the information of the standby TWDM channel corresponding to each TWDM channel dynamically.

In the present embodiment, it is feasible that when the OLT cannot receive the uplink signal sent by all the ONUs, the OLT informs all the ONUs working on the current TWDM channel to tune to the standby TWDM channel to perform protection switching. The ONU receiving the command tunes to the standby channel to complete protection switching. After completing tuning, the ONU enters the O1 state and starts activating on the channel; or the ONU enters the state O4 and ranges; or the ONU enters the state O5 and works directly.

Example 4

In Step 1, the OLT sends the ONU the identifier of the standby TWDM channel corresponding to each TWDM channel, or the uplink wavelength identifier or downlink wavelength identifier corresponding to the standby TWDM channel, or the uplink wavelength value or downlink wavelength value corresponding to the standby TWDM channel.

In certain embodiments, the OLT can send the ONU one of the messages shown in FIG. 7 to FIG. 12. For example, the OLT can send the above information to the ONU in one of following two ways.

The first way: the OLT periodically broadcasts the information in FIG. 7, FIG. 8, FIG. 10 or FIG. 11 to the ONU on all the TWDM channels.

The second way: the OLT periodically broadcasts the information in FIG. 8, FIG. 9, FIG. 11 or FIG. 12 on each TWDM channel.

In Step 2, the ONU stores the information.

In Step 3, after the working TWDM channel has a failure, the OLT transmits the transmission convergence layer configuration information of all the ONUs on the current TWDM channel to the standby TWDM channel corresponding to the current TWDM channel; when the downlink synchronization loss is detected by the ONU, the ONU enters the O6 state and starts the timer T2; if the ONU does not receive the downlink signal after the timer T2 times out, the ONU enters the state O8 (the wavelength tuning state).

The ONU retains the transmission convergence layer configuration parameters of the ONU, starts wavelength tuning, and tunes to the standby TWDM channel corresponding to the current working TWDM channel; after completing tuning, the ONU enters the state O5 or state O4s, and starts working on the channel.

In certain embodiments, the OLT can update the information of the standby TWDM channel corresponding to each TWDM channel dynamically.

In the present embodiment, it is feasible that when the OLT cannot receive the uplink signal sent by all the ONUs, the OLT informs all the ONUs working on the current TWDM channel to tune to the standby TWDM channel to perform protection switching. The ONU receiving the command tunes to the standby channel to complete protection switching. After completing tuning, the ONU enters the O1 state and starts activating on the channel; or the ONU enters the state O4 and ranges; or the ONU enters the state O5 and works directly.

Example 5

In Step 1, the OLT sends the ONU the identifier of the standby TWDM channel corresponding to each TWDM channel, or the uplink wavelength identifier or downlink wavelength identifier corresponding to the standby TWDM channel, or the uplink wavelength value or downlink wavelength value corresponding to the standby TWDM channel.

In certain embodiments, the OLT can send the ONU one of the messages shown in FIG. 7 to FIG. 12. For example, the OLT can send the above information to the ONU in one of following two ways.

The first way: the OLT periodically broadcasts the information in FIG. 7, FIG. 8, FIG. 10 or FIG. 11 to the ONU on all the TWDM channels.

The second way: the OLT periodically broadcasts the information in FIG. 8, FIG. 9, FIG. 11 or FIG. 12 on each TWDM channel.

In Step 2, the ONU stores the information.

In Step 3, after the working TWDM channel has a failure, the OLT transmits the transmission convergence layer configuration information of all the ONUs on the current TWDM channel to the standby TWDM channel corresponding to the current TWDM channel; when the downlink synchronization loss is detected by the ONU, the ONU enters the O6 state and starts the timer T2; if the ONU does not receive the downlink signal after the timer T2 times out, the ONU starts wavelength tuning; the ONU tunes to the standby TWDM channel corresponding to the current working TWDM channel; after completing tuning, the ONU enters the state O5 or the state O4 and starts working on the channel.

In certain embodiments, the OLT can update the information of the standby TWDM channel corresponding to each TWDM channel dynamically.

In the present embodiment, it is feasible that when the OLT cannot receive the uplink signal sent by all the ONUs, the OLT informs all the ONUs working on the current TWDM channel to tune to the standby TWDM channel to perform protection switching. The ONU receiving the command tunes to the standby channel to complete protection switching. After completing tuning, the ONU enters the O1 state and starts activating on the channel; or the ONU enters the state O4 and ranges; or the ONU enters the state O5 and works directly.

Example 6

In Step 1, the OLT sends the ONU the information of the standby TWDM channel corresponding to each TWDM channel, wherein the information of the standby TWDM channel includes: the identifier of the standby TWDM channel corresponding to each TWDM channel, or the uplink wavelength identifier and/or downlink wavelength identifier corresponding to the standby TWDM channel, or the uplink wavelength value and/or downlink wavelength value corresponding to the standby TWDM channel.

In certain embodiments, the OLT can send the ONU one of the messages shown in FIG. 7 to FIG. 12. For example, the OLT can send the above information to the ONU in one of following two ways.

The first way: the OLT periodically broadcasts the information in FIG. 7, FIG. 8, FIG. 10 or FIG. 11 to the ONU on all the TWDM channels.

The second way: the OLT periodically broadcasts the information in FIG. 8, FIG. 9, FIG. 11 or FIG. 12 on each TWDM channel.

In Step 2, the ONU stores the information.

In Step 3, when the downlink synchronization loss is detected by the ONU, the ONU enters the O6 state and starts the timer T2; if the ONU does not receive the downlink signal after the timer T2 times out, the ONU judges whether the information of the standby TWDM channel is stored locally; if so, the ONU tunes to the standby TWDM channel; if not, the ONU returns to the state O1.

In the present embodiment, if the information of the standby TWDM channel is stored, the ONU tunes to the standby TWDM channel. The ONU can switch from the O6 state to the wavelength tuning state and tune to the standby TWDM channel in the wavelength tuning state; or the ONU can tune to the standby TWDM channel in the O6 state; or the ONU can switch from the O6 state to the state O1 and tune to the standby TWDM channel in the state O1.

In the present embodiment, after tuning to the standby TWDM channel, the ONU can enter the state O1 (the initial state), the state O4 (the ranging state) or the state O5 (the running state).

In the present embodiment, it is feasible that when the OLT cannot receive the uplink signals sent by all the ONUs, the OLT informs all the ONUs working on the current TWDM channel to tune to the standby TWDM channel to perform protection switching. The ONU receiving the command tunes to the standby channel to complete protection switching. After completing tuning, the ONU enters the O1 state and starts activating on the channel; or the ONU enters the state O4 and ranges; or the ONU enters the state O5 and works directly.

Example 7

In Step 1, the OLT sends the ONU the information of the standby TWDM channel corresponding to each TWDM channel, wherein the information of the standby TWDM channel includes: the identifier of the standby TWDM channel corresponding to each TWDM channel, or the uplink wavelength identifier and/or downlink wavelength identifier corresponding to the standby TWDM channel, or the uplink wavelength value and/or downlink wavelength value corresponding to the standby TWDM channel.

In certain embodiments, the OLT can send the ONU one of the messages shown in FIG. 7 to FIG. 12. For example, the OLT can send the above information to the ONU in one of following two ways.

The first way: the OLT periodically broadcasts the information in FIG. 7, FIG. 8, FIG. 10 or FIG. 11 to the ONU on all the TWDM channels.

The second way: the OLT periodically broadcasts the information in FIG. 8, FIG. 9, FIG. 11 or FIG. 12 on each TWDM channel.

In Step 2, the ONU stores the information.

In Step 3, when the downlink synchronization loss is detected by the ONU, the ONU enters the O6 state and starts the timer T2; if the ONU does not receive the downlink signal after the timer T2 times out, the ONU returns to the state O1, tunes to the standby TWDM channel and starts activating on the standby TWDM channel.

INDUSTRIAL APPLICABILITY

In the present disclosure, the ONU acquires the channel information of the first TWDM channel, wherein the channel information of the first TWDM channel is used for indicating the uplink wavelength and/or downlink wavelength of the first TWDM channel; and the ONU tunes its uplink wavelength and/or downlink wavelength into the uplink wavelength and/or downlink wavelength of the first TWDM channel according to the channel information of the first TWDM channel; in this way, the problem of high cost caused by specially building a standby channel for each TWDM channel in the TWDM PON system to provide service protection is solved, and the cost of deploying the TWDM PON system is reduced.

Obviously, those skilled in the art should appreciate that the above components and steps of the present disclosure can be implemented by a general-purpose computing device, and they can be centralized in a single computing device or distributed on a network composed of multiple computing devices; In certain embodiments, they can be implemented by a program code which is capable of being executed by the computing device, so that they can be stored in a storage device and executed by the computing device; or they are made into integrated circuit components, respectively, or multiple components and steps of them are made into a single integrated circuit component to implement. In this way, the present disclosure is not limited to any particular combination of hardware and software.

The above is only the example embodiments of the present disclosure and not intended to limit the present disclosure; for those skilled in the art, the present disclosure may have various modifications and changes. Any modifications, equivalent replacements, improvements and the like within the principle of the present disclosure shall fall within the scope of the claims of the present disclosure.

What is claimed is:

1. A method for channel switching, comprising:
acquiring, by an Optical Network Unit (ONU), channel information of a first Time Wavelength Division Multiplexing (TWDM) channel, wherein the channel information of the first TWDM channel is used for indicating an uplink wavelength and/or downlink wavelength of the first TWDM channel; and
tuning, by the ONU, an uplink wavelength and/or downlink wavelength of the ONU into the uplink wavelength and/or downlink wavelength of the first TWDM channel according to the channel information of the first TWDM channel;
wherein after tuning, by the ONU, the uplink wavelength and/or downlink wavelength of the ONU into the uplink wavelength and/or downlink wavelength of the first TWDM channel, the method further comprises: switching, by the ONU, a service of the ONU to the first TWDM channel;
or after acquiring, by the ONU, the information of the first TWDM channel, the method further comprises: storing, by the ONU, the channel information of the first TWDM channel;
or acquiring, by the ONU, the channel information of the first TWDM channel comprises: receiving, by the ONU, channel information of multiple TWDM channels, wherein the channel information of the multiple TWDM channels is used for indicating uplink wavelengths and/or downlink wavelengths of the multiple TWDM channels and a corresponding relationship between each TWDM channel and a standby TWDM channel of the TWDM channel; determining, by the ONU, a standby TWDM channel corresponding to a second TWDM channel as the first TWDM channel according to the corresponding relationship;
or the channel information of the first TWDM channel comprises at least one of the followings: a channel identifier of the first TWDM channel, an uplink wavelength identifier and/or downlink wavelength identifier of the first TWDM channel, and an uplink wavelength value and/or downlink wavelength value of the first TWDM channel;
or before tuning, by the ONU, the uplink wavelength and/or downlink wavelength of the ONU into the uplink wavelength and/or downlink wavelength of the first TWDM channel, the method further comprises: judging whether or not a second TWDM channel on which the ONU works currently is normal, wherein when the second TWDM channel is abnormal, tuning, by the ONU, the uplink wavelength and/or downlink wavelength of the ONU into the uplink wavelength and/or downlink wavelength of the first TWDM channel;
wherein when judging whether or not the second TWDM channel is normal, determining that the second TWDM channel is abnormal comprises:
detecting, by the ONU, that downlink signals on the second TWDM channel are out of synchronization;
entering, by the ONU, a state O6, and starting, by the ONU, a timer T2; and
when not receiving a downlink signal before the timer T2 times out, determining, by the ONU, that the second TWDM channel is abnormal.

2. The method as claimed in claim 1, wherein the channel information of the first TWDM channel is periodically broadcasted by an Optical Line Terminal (OLT) on at least one TWDM channel, wherein the at least one TWDM channel comprises the second TWDM channel;
or judging whether or not the second TWDM channel on which the ONU works currently is normal comprises: receiving, by the ONU, a notification about abnormity which is sent by an OLT, wherein the notification about abnormity is sent by the OLT to all the ONUs which work on the second TWDM channel, under a condition that the OLT fails to receive, through the second TWDM channel, uplink signals of all the ONUs which work on the second TWDM channel; and determining that the second TWDM channel is abnormal according to the notification about abnormity; or judging, by the ONU, that whether or not a duration of failing to detect a downlink signal on the second TWDM channel exceeds a preset duration; and when the duration exceeds the preset duration, determining that the second TWDM channel is abnormal;

or the channel information of the first TWDM channel is dynamically updated and provided to the ONU by an OLT.

3. The method as claimed in claim 1, wherein when the second TWDM channel is abnormal, tuning, by the ONU, the uplink wavelength and/or downlink wavelength of the ONU into the uplink wavelength and/or downlink wavelength of the first TWDM channel comprises:

entering, by the ONU, a state O1, tuning, by the ONU, the uplink wavelength and/or downlink wavelength of the ONU into the uplink wavelength and/or downlink wavelength of the first TWDM channel, and starting, by the ONU, activating on the first TWDM channel; or entering, by the ONU, the state O1 and starting, by the ONU, a timer T3; when not receiving, by the ONU, the downlink signal before the timer T3 times out, entering, by the ONU, a state O8, which is a wavelength tuning state, wherein in the state O8, the ONU tunes the uplink wavelength and/or downlink wavelength of the ONU into the uplink wavelength and/or downlink wavelength of the first TWDM channel, and receives a downlink signal through the first TWDM channel after completing the tuning; and the ONU enters a state O4 or a state O5 after a synchronization of the downlink signal is completed.

4. The method as claimed in claim 3, wherein, when entering the state O1 or the state O8, the ONU retains transmission convergence layer configuration parameters of the ONU; and/or when receiving the downlink signal before the timer T3 times out, the ONU clears the transmission convergence layer configuration parameters.

5. The method as claimed in claim 1, wherein when the second TWDM channel is abnormal, the method further comprises:

transmitting, by the OLT, transmission convergence layer configuration information of all ONUs which work on the second TWDM channel to the first TWDM channel.

6. The method as claimed in claim 1, wherein when the second TWDM channel is abnormal, tuning, by the ONU, the uplink wavelength and/or downlink wavelength of the ONU into the uplink wavelength and/or downlink wavelength of the first TWDM channel comprises:

entering, by the ONU, a state O8, which is a wavelength tuning state, wherein in the state O8, the ONU retains, transmission convergence layer configuration parameters of the ONU, and tunes the uplink wavelength and/or downlink wavelength of the ONU into the uplink wavelength and/or downlink wavelength of the first TWDM channel; and the ONU enters a state O4 or a state O5 after completing the tuning; or, the ONU tunes the uplink wavelength and/or downlink wavelength of the ONU into the uplink wavelength and/or downlink wavelength of the first TWDM channel, and enters the state O4 or the state O5 after completing the tuning;

or when the second TWDM channel is abnormal, before tuning, by the ONU, the uplink wavelength and/or downlink wavelength of the ONU into the uplink wavelength and/or downlink wavelength of the first TWDM channel, the method further comprises: judging, by the ONU, whether or not channel information of the second TWDM channel is stored locally, when the ONU judges that the channel information of the second TWDM channel is stored locally, tuning, by the ONU, the uplink wavelength and/or downlink wavelength of the ONU into the uplink wavelength and/or downlink wavelength of the first TWDM channel.

7. The method as claimed in claim 6, wherein when the ONU judges that the channel information of the second TWDM channel is not stored locally, the method further comprises:

entering, by the ONU, a state O1.

8. A device for channel switching, comprising:

an acquiring component, which is configured to acquire channel information of a first Time Wavelength Division Multiplexing (TWDM) channel, wherein the channel information of the first TWDM channel is used for indicating an uplink wavelength and/or downlink wavelength of the first TWDM channel; and a tuning component, which is configured to tune an uplink wavelength and/or downlink wavelength of an Optical Network Unit (ONU) into the uplink wavelength and/or downlink wavelength of the first TWDM channel according to the channel information of the first TWDM channel;

wherein the device further comprising:

a switching component, which is configured to switch a service of the ONU to the first TWDM channel;

or further comprising: a storing component, which is configured to store the channel information of the first TWDM channel;

or the acquiring component comprises: a first receiving element, which is configured to receive channel information of multiple TWDM channels, wherein the channel information of the multiple TWDM channels is used for indicating uplink wavelengths and/or downlink wavelengths of multiple TWDM channels and a corresponding relationship between each TWDM channel and a standby TWDM channel of the TWDM channel; and a first determining element, which is configured to determine a standby TWDM channel corresponding to a second TWDM channel as the first TWDM channel according to the corresponding relationship;

or further comprising: a first judging component, which is configured to judge whether or not a second TWDM channel on which the ONU works currently is normal and when the second TWDM channel is abnormal enable the tuning component to tune the uplink wavelength and/or downlink wavelength of the ONU into the uplink wavelength and/or downlink wavelength of the first TWDM channel;

or the channel information of the first TWDM channel comprises at least one of the followings: a channel identifier of the first TWDM channel, an uplink wavelength identifier and/or downlink wavelength identifier of the first TWDM channel, and an uplink wavelength value and/or downlink wavelength value of the first TWDM channel;

wherein the channel information of the first TWDM channel is periodically broadcasted by an Optical Line Terminal (OLT) on at least one TWDM channel, wherein the at least one TWDM channel comprises the second TWDM channel;

or the first judging component comprises: a first receiving element, which is configured to receive a notification about abnormity which is sent by an OLT, wherein the notification about abnormity is sent by the OLT to all the ONUs which work on the second TWDM channel, under a condition that the OLT fails to receive, through the second TWDM channel, the uplink signals of all the ONUs which work on the second TWDM channel; and a first judging element, which is configured to determine that the second TWDM channel is abnormal according to the notification about abnormity;

or the first judging component comprises: a second judging element, which is configured to judge that whether or not a duration of failing to detect a downlink signal on the second TWDM channel, exceeds a preset duration; and a third judging element, which is configured to determine that the second TWDM channel is abnormal when the duration exceeds the preset duration;

wherein the third judging element is configured to detect that downlink signals of the ONU on the second TWDM channel are out of synchronously, enter a state O6, and start a timer T2; and the third judging element is further configured to determine that the second TWDM channel is abnormal when not receiving a downlink signal before the timer 2 times out.

9. The device as claimed in claim 8, wherein, the tuning component is configured to, when the second TWDM channel is abnormal, enter a state O1, tune the uplink wavelength and/or downlink wavelength of the ONU into the uplink wavelength and/or downlink wavelength of the first TWDM channel, and start activating on the first TWDM channel; or the tuning component is configured to, when the second TWDM channel is abnormal, enter the state O1 and start a timer T3; or the tuning component is configured to, when the downlink signal is not received by the ONU before the timer T3 times out, enter a state O8, which is wavelength tuning state, and in the state O8, tune the uplink wavelength and/or downlink wavelength of the ONU into the uplink wavelength and/or downlink wavelength of the first TWDM channel, and receive the downlink signal through the first TWDM channel after completing tuning; the tuning component is configured to enter a state O4 or a state O5 after a the synchronization of the downlink signal is completed;

or the tuning component is configured to, when the second TWDM channel is abnormal, enter the state O8, which is a wavelength tuning state, and in the state O8, retain transmission convergence layer configuration parameters of the ONU, and tune the uplink wavelength and/or downlink wavelength of the ONU into the uplink wavelength and/or downlink wavelength of the first TWDM channel and enter the state O4 or the state O5 after completing tuning; or the tuning component is configured to, when the second TWDM channel is abnormal, tune the uplink wavelength and/or downlink wavelength of the ONU into the uplink wavelength and/or downlink wavelength of the first TWDM channel, and enter the state O4 or the state O5 after completing tuning;

or further comprising: a second judging component, which is configured to, when the second TWDM channel is abnormal, judge whether or not the channel information of the second TWDM channel is stored locally; when it is determined that the channel information of the second TWDM channel is stored locally, to enable the tuning component to tune the uplink wavelength and/or downlink wavelength of the ONU into the uplink wavelength and/or downlink wavelength of the first TWDM channel.

10. The device as claimed in claim 9, wherein, the third judging element is further configured to, when entering the state O1 or the state O8, retain transmission convergence layer configuration parameters of the ONU; or the third judging element is further configured to clear the transmission convergence layer configuration parameters when the downlink signal is received before the timer T3 times out;

or further comprising: an indicating component, which is configured to, when the second judging component judges that the channel information of the second TWDM channel is not stored locally, indicate the ONU to enter the state O1.

11. The device as claimed in claim 8, wherein the channel information of the first TWDM channel is dynamically updated and provided to the ONU by the OLT.

12. An Optical Network Unit (ONU), comprising: a device for channel switching according to claim 8.

13. A Time Wavelength Division Multiplexing (TWDM) system, comprising: an Optical Line Terminal (OLT) and an Optical Network Unit (ONU), wherein, the OLT is configured to send channel information of a first TWDM channel, wherein the channel information of the first TWDM channel is used for indicating an uplink wavelength and/or downlink wavelength of the first TWDM channel; and the ONU is configured to acquire the channel information of the first TWDM channel and tune, according to the channel information of the first TWDM channel, an uplink wavelength and/or downlink wavelength of the ONU into the uplink wavelength and/or downlink wavelength of the first TWDM channel;

wherein the ONU is further configured to switch a service of the ONU to the first TWDM channel, to store the channel information of the first TWDM channel, or to receive channel information of multiple TWDM channels, wherein the channel information of the multiple TWDM channels is used for indicating uplink wavelengths and/or downlink wavelengths of multiple TWDM channels and a corresponding relationship between each TWDM channel and a standby TWDM channel of the TWDM channel; and to determine a standby TWDM channel corresponding to a second TWDM channel as the first TWDM channel according to the corresponding relationship;

or the ONU is further configured to judge whether or not a second TWDM channel on which the ONU works currently is normal and when the second TWDM channel is abnormal enable the ONU to tune the uplink wavelength and/or downlink wavelength of the ONU into the uplink wavelength and/or downlink wavelength of the first TWDM channel;

or the channel information of the first TWDM channel comprises at least one of the followings: a channel identifier of the first TWDM channel, an uplink wavelength identifier and/or downlink wavelength identifier of the first TWDM channel, and an uplink wavelength value and/or downlink wavelength value of the first TWDM channel;

wherein the channel information of the first TWDM channel is periodically broadcasted by an Optical Line Terminal (OLT) on at least one TWDM channel, wherein the at least one TWDM channel comprises the second TWDM channel;

or the ONU is further configured to receive a notification about abnormity which is sent by an OLT, wherein the notification about abnormity is sent by the OLT to all the ONUs which work on the second TWDM channel, under a condition that the OLT fails to receive, through the second TWDM channel, the uplink signals of all the ONUs which work on the second TWDM channel; and to determine that the second TWDM channel is abnormal according to the notification about abnormity;
or the ONU is further configured to judge that whether or not a duration of failing to detect a downlink signal on the second TWDM channel, exceeds a preset duration, to determine that the second TWDM channel is abnormal when the duration exceeds the preset duration;
wherein the ONU is configured to detect that downlink signals of the ONU on the second TWDM channel are out of synchronously, enter a state O6, and start a timer T2, and to determine that the second TWDM channel is abnormal when not receiving a downlink signal before the timer 2 times out.

14. The system as claimed in claim 13, wherein the OLT is further configured to, when the second TWDM channel is abnormal, transmit transmission convergence layer configuration information of all ONUs which work on the second TWDM channel to the first TWDM channel.

* * * * *